United States Patent
Williams et al.

(10) Patent No.: US 12,415,560 B2
(45) Date of Patent: Sep. 16, 2025

(54) STROLLER

(71) Applicant: Wonderland Switzerland AG, Steinhausen (CH)

(72) Inventors: Bruce L. Williams, Narvon, PA (US); Gregory Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 653 days.

(21) Appl. No.: 17/373,743

(22) Filed: Jul. 12, 2021

(65) Prior Publication Data

US 2021/0339786 A1 Nov. 4, 2021

Related U.S. Application Data

(63) Continuation-in-part of application No. 16/417,657, filed on May 21, 2019, now Pat. No. 11,091,185.

(60) Provisional application No. 62/703,153, filed on Jul. 25, 2018, provisional application No. 62/674,052, filed on May 21, 2018.

(51) Int. Cl.
*B62B 3/00* (2006.01)
*B62B 7/00* (2006.01)
*B62B 7/06* (2006.01)
*B62B 7/08* (2006.01)

(52) U.S. Cl.
CPC .............. *B62B 7/08* (2013.01); *B62B 7/004* (2013.01); *B62B 7/062* (2013.01); *B62B 2205/06* (2013.01); *B62B 2205/20* (2013.01)

(58) Field of Classification Search
CPC .......... B62B 7/062; B62B 7/08; B62B 7/066; B62B 7/06; B62B 7/004; B62B 9/203; B62B 9/20; B62B 2205/26; B62B 2205/003; B62B 2205/20; B62B 2205/06
See application file for complete search history.

(56) References Cited

U.S. PATENT DOCUMENTS 4,180,276 A * 12/1979 Kassai ................. B62B 7/06
280/47.36
4,191,397 A * 3/1980 Kassai .................. B62B 7/062
403/92

(Continued)

FOREIGN PATENT DOCUMENTS

CN 203094146 U 7/2013
CN 103373382 A 10/2013
(Continued)

*Primary Examiner* — James M Dolak
(74) *Attorney, Agent, or Firm* — Winston Hsu

(57) ABSTRACT

A stroller includes a front leg, a rear leg rotatably connected to the front leg, a handle assembly and a locking component. The handle assembly is rotatably connected to one of the front leg and the rear leg. The locking component is movably disposed on the handle assembly. The locking component can be driven to disengage from the one of the front leg and the rear leg for allowing the rotating movement of the handle assembly during a rotating movement of an upper handle portion of the handle assembly. Furthermore, the rotating movement of the handle assembly can drive the other one of the front leg and the rear leg to rotate. Therefore, the entire stroller is allowed to be folded easily and compactly by disengaging the locking component and then rotating the handle assembly, which brings convenience in use.

10 Claims, 10 Drawing Sheets

(56) References Cited

U.S. PATENT DOCUMENTS

| | | | |
|---|---|---|---|
| 8,226,110 B2* | 7/2012 | Liao | B62B 7/064 |
| | | | 280/47.38 |
| 8,602,442 B2 | 12/2013 | Li | |
| 8,672,341 B2* | 3/2014 | Offord | B62B 7/08 |
| | | | 280/47.38 |
| 9,044,104 B2* | 6/2015 | Smith | B62B 7/062 |
| 9,193,372 B2 | 11/2015 | Haut | |
| 9,475,516 B1* | 10/2016 | Wang | B62B 7/10 |
| 9,540,027 B1* | 1/2017 | Hanson | B62B 7/066 |
| 9,545,939 B1 | 1/2017 | Wight | |
| 9,637,154 B2 | 5/2017 | Liu | |
| 9,638,243 B2 | 5/2017 | Li | |
| 9,701,333 B2* | 7/2017 | Liu | B62B 9/00 |
| 9,796,405 B2* | 10/2017 | Li | B62B 7/062 |
| 9,908,551 B2* | 3/2018 | Ransil | B62B 9/102 |
| 10,000,226 B2 | 6/2018 | Yi | |
| 10,144,442 B2* | 12/2018 | Ransil | B62B 7/062 |
| 10,155,528 B2* | 12/2018 | Zhong | B62B 7/062 |
| 10,286,941 B2* | 5/2019 | Li | B62B 7/062 |
| 10,399,589 B2 | 9/2019 | Horst | |
| 10,479,391 B2 | 11/2019 | Haut | |
| 10,526,000 B2 | 1/2020 | Horst | |
| 10,618,542 B2* | 4/2020 | Cai | B62B 7/10 |
| 10,766,517 B2 | 9/2020 | Cheng | |
| 10,787,188 B2 | 9/2020 | Popp | |
| 10,822,012 B2 | 11/2020 | Liu | |
| 10,882,546 B2 | 1/2021 | Wang | |
| 10,894,555 B2* | 1/2021 | Huang | B62B 7/062 |
| 10,926,785 B2 | 2/2021 | Ambar | |
| 11,091,185 B2* | 8/2021 | Williams | B62B 7/062 |
| 11,136,055 B2* | 10/2021 | Zehfuss | B62B 7/062 |
| 11,390,311 B2* | 7/2022 | Horst | B62B 7/064 |
| 11,945,491 B2* | 4/2024 | Horst | B62B 7/064 |
| 11,970,200 B2* | 4/2024 | Yi | B62B 9/20 |
| 11,987,281 B2* | 5/2024 | Guo | B62B 7/08 |
| 12,128,943 B2* | 10/2024 | Yuan | B62B 9/085 |
| 12,139,187 B2* | 11/2024 | Wu | B62B 9/245 |
| 12,233,931 B2* | 2/2025 | Li | B62B 7/064 |
| 12,275,448 B2* | 4/2025 | Ma | B62B 7/064 |
| 2015/0307121 A1 | 10/2015 | Liu | |
| 2017/0144687 A1 | 5/2017 | Li | |
| 2017/0297600 A1 | 10/2017 | Zhong | |
| 2018/0001920 A1 | 1/2018 | Li | |

FOREIGN PATENT DOCUMENTS

| | | |
|---|---|---|
| CN | 103738382 A | 4/2014 |
| CN | 104908794 A | 9/2015 |
| CN | 205273574 U | 6/2016 |
| DE | 10 2015 112 332 A1 | 2/2017 |
| DE | 10 2017 109 236 A1 | 11/2017 |
| EP | 2 949 542 A2 | 12/2015 |
| WO | 2018/009971 A1 | 1/2018 |

* cited by examiner

STROLLER

CROSS REFERENCE TO RELATED APPLICATIONS

This is a continuation-in-part application of U.S. patent application Ser. No. 16/417,657, which is filed on May 21, 2019 and claims the benefit of U.S. Provisional Patent Application No. 62/674,052 filed on May 21, 2018 and US Provisional Patent Application No. 62/703,153 filed on Jul. 25, 2018, and the contents of this application are incorporated herein by reference.

BACKGROUND OF THE INVENTION

1. Field of the Invention

The present invention relates to a child product, and more particularly to a stroller capable of being folded easily and compactly.

2. Description of the Prior Art

With advancement of technology and development of economy, there are more and more consumer goods available in the market to bring convenience into people's lives. For example, a stroller is indispensable for carrying an infant or a child. The stroller can not only provide a safe and comfortable environment for the infant or the child but also bring convenience for a caregiver to carry the infant or the child when travelling. The stroller usually has foldable structure, so that the stroller can be folded to reduce an occupied space of the stroller for transportation or storage of the stroller. However, some of the conventional strollers are not lightweight and cannot be folded compactly, which makes it difficult to carry or stow the strollers when travelling, especially when using public transportation. In addition, some of the conventional strollers have complicated structure and folding sequence, which makes it difficult to unfold or fold the strollers.

Therefore, there is a need to provide an improved stroller for solving the aforementioned problems.

SUMMARY OF THE INVENTION

It is an objective of the present invention to provide a stroller capable of being folded easily and compactly.

In order to achieve the aforementioned objective, the present invention discloses a stroller. The stroller includes a front leg, a rear leg, a handle assembly and a locking component. The rear leg is rotatably connected to the front leg. The handle assembly is rotatably connected to the front leg. The handle assembly includes a lower handle portion and an upper handle portion rotatable relative to the lower handle portion. The locking component is movably disposed on the handle assembly. The locking component engages with the front leg for restraining a rotating movement of the handle assembly relative to the front leg in a first pivoting direction and is further driven to disengage from the front leg for allowing the rotating movement of the handle assembly relative to the front leg in the first pivoting direction during a rotating movement of the upper handle portion relative to the lower handle portion in a second pivoting direction opposite to the first pivoting direction. The handle assembly and the front leg cooperatively engage with the rear leg for restraining a rotating movement of the rear leg relative to the front leg when the locking component engages with the front leg.

According to an embodiment of the present invention, the front leg includes an engaging component engaging with the locking component.

According to an embodiment of the present invention, the handle assembly includes a first abutting portion. The front leg includes a second abutting portion, and the rear leg is clamped by the first abutting portion and the second abutting portion cooperatively for restraining the rotating movement of the rear leg relative to the front leg.

According to an embodiment of the present invention, the stroller further includes a linking component rotatably connected to the handle assembly and the rear leg. A rotating connection of the linking component and the rear leg and a rotating connection of the front leg and the rear leg are located in different positions. A rotating connection of the handle assembly and the linking component and A rotating connection of the handle assembly and the front leg are located in different positions, and the handle assembly drives the rear leg to rotate relative to the front leg by the linking component when the handle assembly rotates relative to the front leg.

According to an embodiment of the present invention, the stroller further includes a resilient component abutting against the locking component to bias the locking component to engage with the front leg.

According to an embodiment of the present invention, the stroller further includes a connecting component connected to the locking component, and the connecting component driving the locking component to disengage from the front leg.

According to an embodiment of the present invention, the stroller further includes a handle pivoting assembly disposed between the upper handle portion and the lower handle portion, and the handle pivoting assembly restrains or allows the rotating movement of the upper handle portion relative to the lower handle portion in the second pivoting direction.

According to an embodiment of the present invention, the connecting component is further connected to one of the handle pivoting assembly and the upper handle portion, and the one of the handle pivoting assembly and the upper handle portion drives the locking component to disengage from the front leg by the connecting component during the rotating movement of the upper handle portion relative to the lower handle portion in the second pivoting direction.

According to an embodiment of the present invention, the stroller further includes an operating component connected to the handle pivoting assembly, the operating component unlocks the handle pivoting assembly for allowing the rotating movement of the upper handle portion relative to the lower handle portion in the second pivoting direction when the operating component is operated.

Furthermore, the present invention further discloses a stroller. The stroller includes a front leg, a rear leg, a handle assembly, a locking component and a linking component. The rear leg is rotatably connected to the front leg. The handle assembly is rotatably connected to the rear leg. The locking component movably disposed on the handle assembly. The locking component engages with the rear leg for restraining a rotating movement of the handle assembly relative to the rear leg and is further driven to disengage from the rear leg for allowing the rotating movement of the handle assembly relative to the rear leg. The handle assembly and the rear leg cooperatively engage with the front leg for restraining a rotating movement of the front leg relative to the rear leg when the locking component engages with the rear leg. The linking component is rotatably connected to the handle assembly and the front leg. The handle assembly drives the front leg to rotate relative to the rear leg rearwardly by the linking component when the handle assembly rotates relative to the rear leg rearwardly.

According to an embodiment of the present invention, the rear leg further comprises an engaging component disposed on the rear leg and engaging with the locking component.

According to an embodiment of the present invention, the stroller further includes a connecting component connected to the locking component and driving the locking component to disengage from the rear leg.

According to an embodiment of the present invention, the stroller further includes an operating component movably disposed on the handle assembly and connected to the connecting component, and the operating component drives the locking component to disengage from the rear leg by the connecting component when the operating component is operated.

According to an embodiment of the present invention, the handle assembly includes a lower handle portion and an upper handle portion. The stroller further includes a handle pivoting assembly disposed between the upper handle portion and the lower handle portion. The handle pivoting assembly restrains or allows a rotating movement of the upper handle portion relative to the lower handle portion.

According to an embodiment of the present invention, the connecting component is further connected to one of the handle pivoting assembly and the upper handle portion, and the one of the handle pivoting assembly and the upper handle portion drives the locking component to disengage from the rear leg by the connecting component during the rotating movement of the upper handle portion relative to the lower handle portion.

According to an embodiment of the present invention, the stroller further includes an operating component connected to the handle pivoting assembly. The operating component unlocks the handle pivoting assembly for allowing the rotating movement of the upper handle portion relative to the lower handle portion when the operating component is operated.

According to an embodiment of the present invention, the operating component is further connected to the connecting component, and the operating component further drives the locking component to disengage from the rear leg by the connecting component when the operating component is operated.

According to an embodiment of the present invention, a rotating connection of the linking component and the front leg and a rotating connection of the rear leg and the front leg are located in different positions. A rotating connection of the handle assembly and the linking component and a rotating connection of the handle assembly and the rear leg are located in different positions, and when the handle assembly rotates relative to the rear leg in a first pivoting direction, the handle assembly drives the front leg to rotate relative to the rear leg in a second pivoting direction by the linking component when the handle assembly rotates relative to the rear leg in a second pivoting direction opposite to the first pivoting direction.

According to an embodiment of the present invention, the handle assembly and the rear leg cooperatively engage with the front leg for restraining a rotating movement of the front leg relative to the rear leg in a clockwise direction and a rotating movement of the front leg relative to the rear leg in a counterclockwise direction when the locking component engages with the rear leg.

In summary, the present invention utilizes the rotating movement of the upper handle portion to drive the locking component to allow the rotating movement of the handle assembly relative to one of the rear leg and the front leg and further utilizes the rotating movement of the handle assembly to drive the other one of the front leg and the rear leg to rotate by the linking component. Therefore, the entire stroller is allowed to be folded easily and compactly by disengaging the locking component and then rotating the handle assembly, which brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct connection. Thus, if a first device is connected to a second device, that connection may be through a direct connection, or through an indirect connection via other devices and connections.

Figure 1:
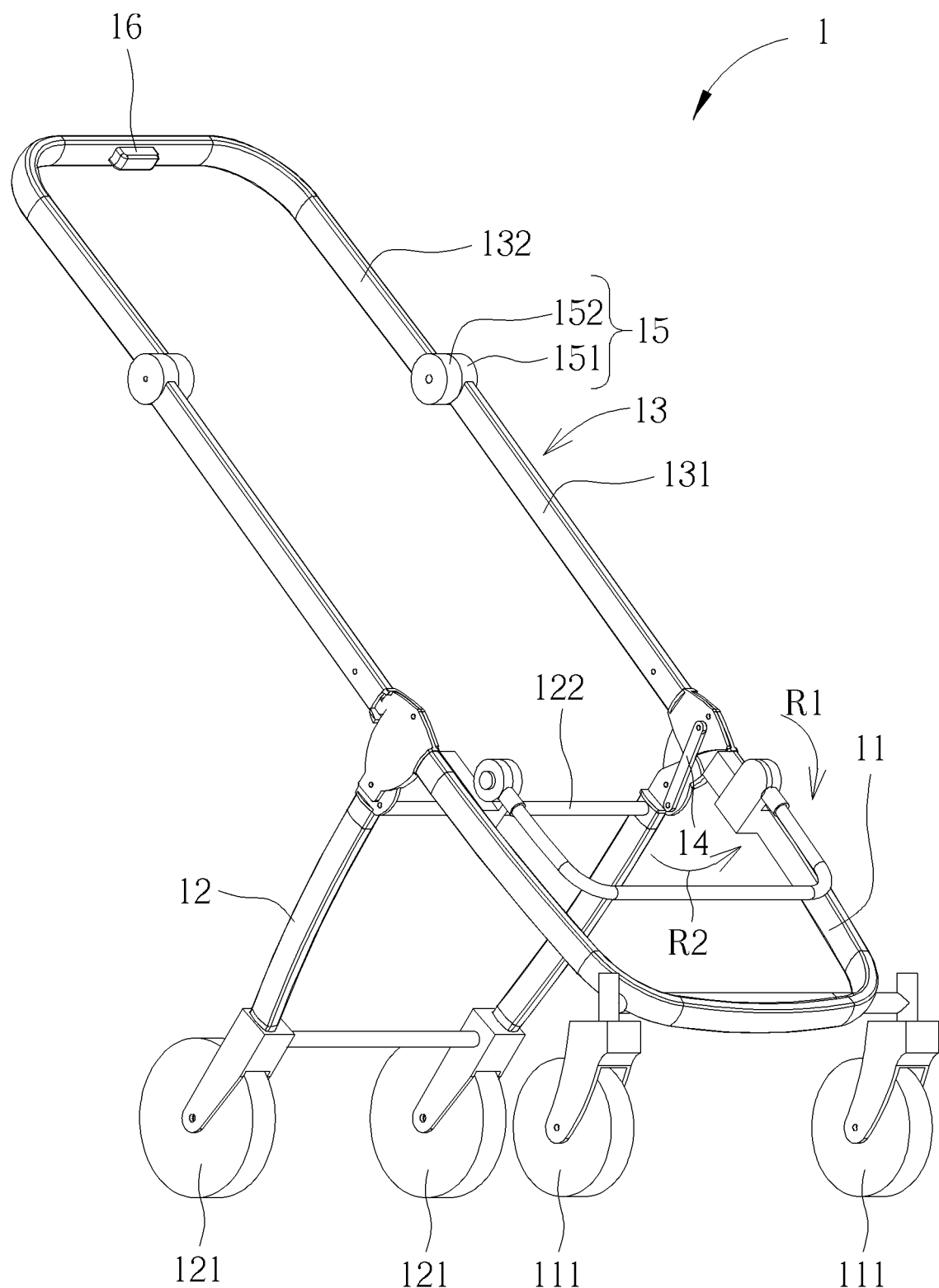
FIG. 1 is a schematic diagram of a stroller according to a first embodiment of the present invention.
Figure 2:
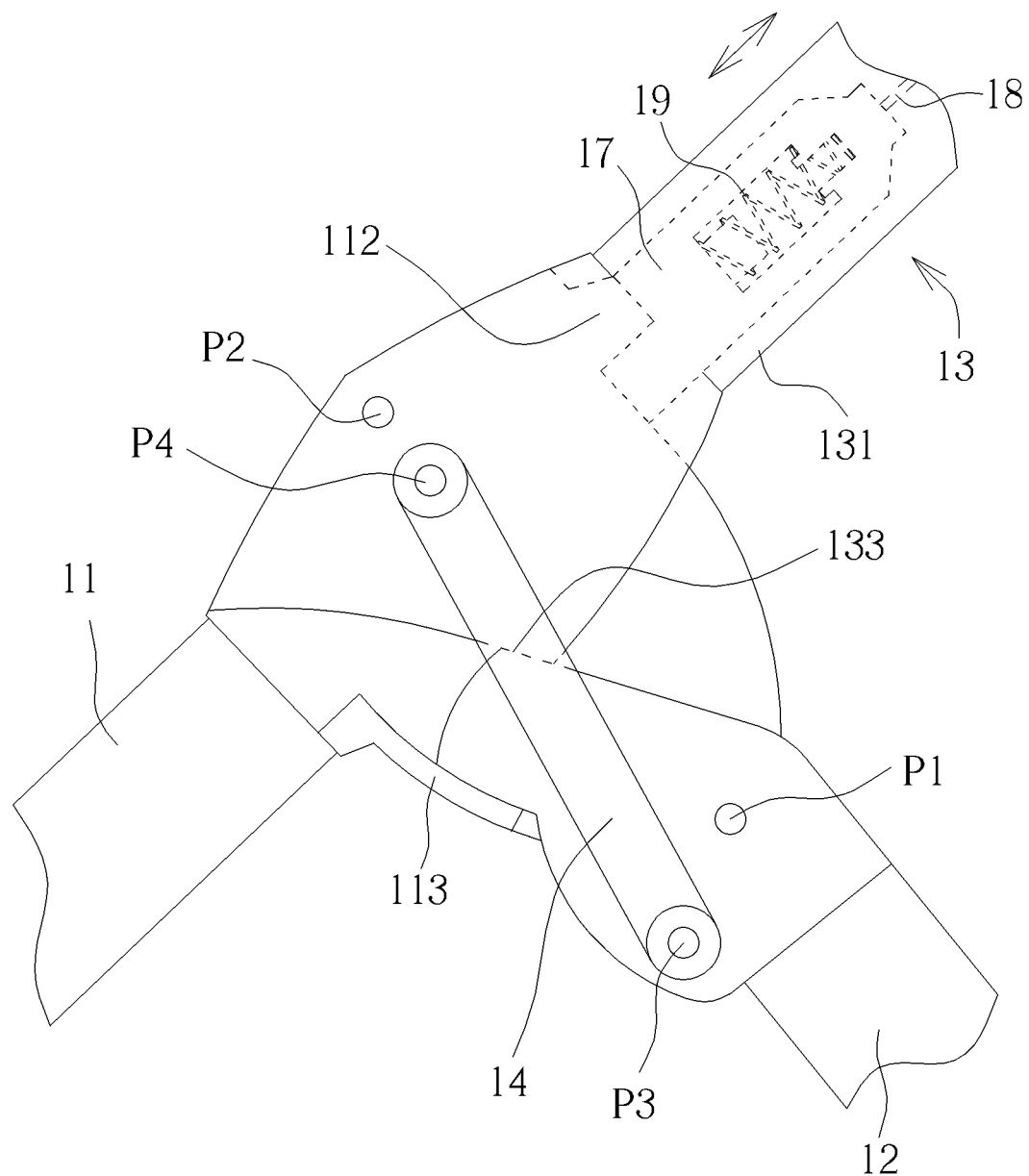
FIG. 2 is a partial enlarged diagram of the stroller according to the first embodiment of the present invention.

Please refer to FIG. 1 and FIG. 2. FIG. 1 is a schematic diagram of a stroller 1 according to a first embodiment of the present invention. FIG. 2 is a partial enlarged diagram of the stroller 1 according to the first embodiment of the present invention. As shown in FIG. 1 and FIG. 2, the stroller 1 includes a front leg 11, a rear leg 12, a handle assembly 13 and a linking component 14. The front leg 11 is provided with two front wheels 111. The rear leg 12 is provided with two rear wheels 121. A child carrier, which is not shown in the figures, can be disposed on the stroller 1 for accommodating a child. The rear leg 12 is rotatably connected to the front leg 11. The handle assembly 13 is rotatably connected to the front leg 11. The linking component 14 is rotatably connected to the handle assembly 13 and the rear leg 12. Therefore, when the handle assembly 13 rotatably folds relative to the front leg 11 forwardly in a first pivoting direction R1, e.g. a clockwise direction in this embodiment, the handle assembly 13 drives the rear leg 12 by the linking component 14 to rotatably fold relative to the front leg 11 forwardly in a second pivoting direction R2 opposite to the first pivoting direction R1, e.g. a counterclockwise direction in this embodiment, so as to achieve a compact and easy folding operation of the stroller 1.

In this embodiment, the rear leg 12 and the handle assembly 13 can be directly pivoted to the front leg 11 at a first pivoting point P1 and a second pivoting point P2 respectively, and the linking component 14 can be directly pivoted to the rear leg 12 and the handle assembly 11 at a third pivoting point P3 and a fourth pivoting point P4 respectively. A rotating connection or a rotating joint, i.e., the third pivoting point P3, of the linking component 14 and the rear leg 11 and a rotating connection or a rotating joint, i.e., the first pivoting point P1, of the front leg 11 and the rear leg 12 are located in different positions. A rotating connection or a rotating joint, i.e., the fourth pivoting point P4, of the handle assembly 13 and the linking component 14 and a rotating connection or a rotating joint, i.e., the second pivoting point P2, of the handle assembly 13 and the front leg 11 are located in different positions.

However, it is not limited to this embodiment. For example, in another embodiment, the rear leg and the handle assembly can be rotatably connected to the front leg via another mechanism, such as a central hub, so that the rear leg and the handle assembly can rotatably fold relative to the front leg, and the linking component also can be rotatably connected to the rear leg and the handle assembly via another mechanism, such a lever.

Figure 12:
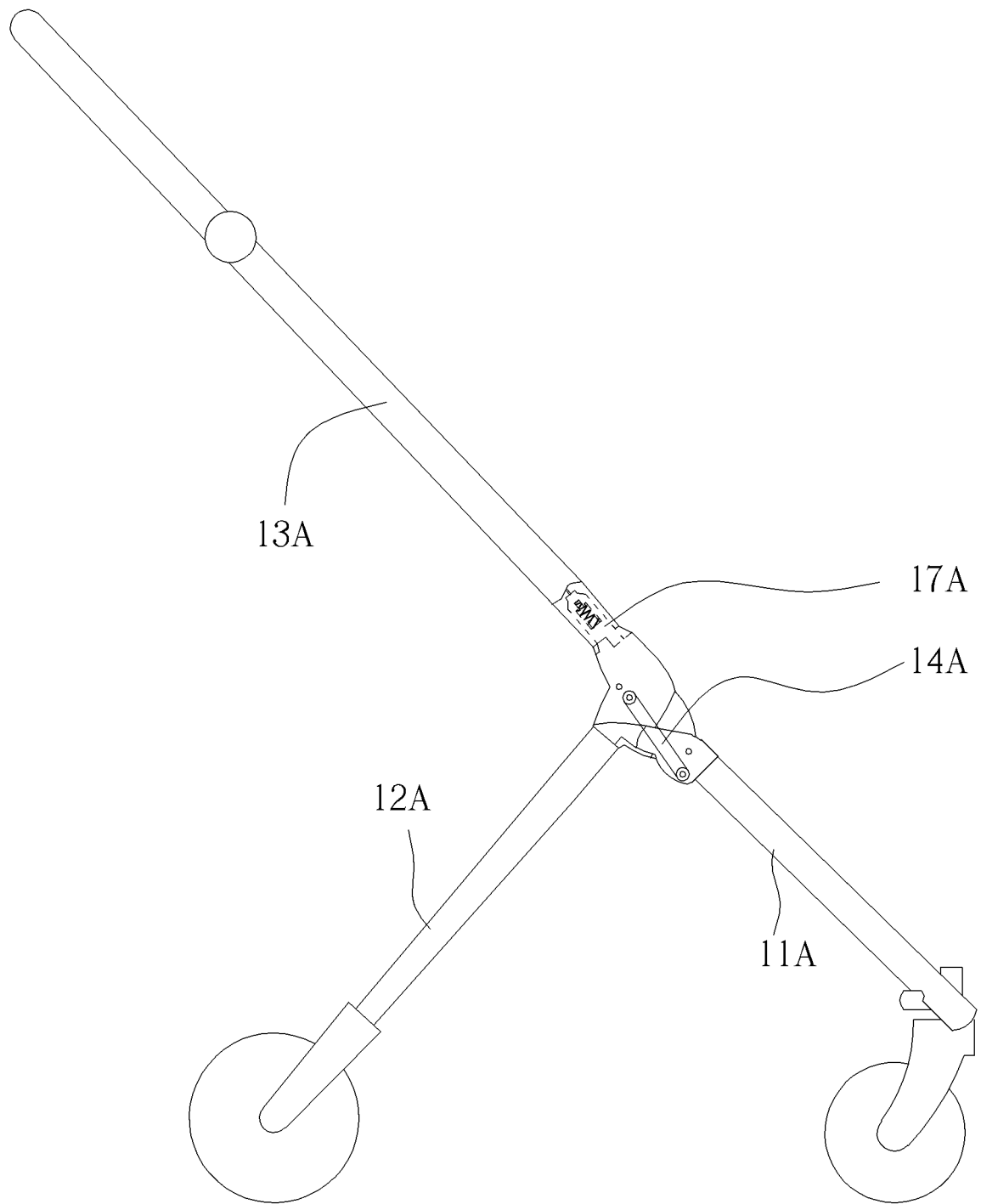
FIG. 12 is a partial diagram of a stroller according to a third embodiment of the present invention.
Figure 13:
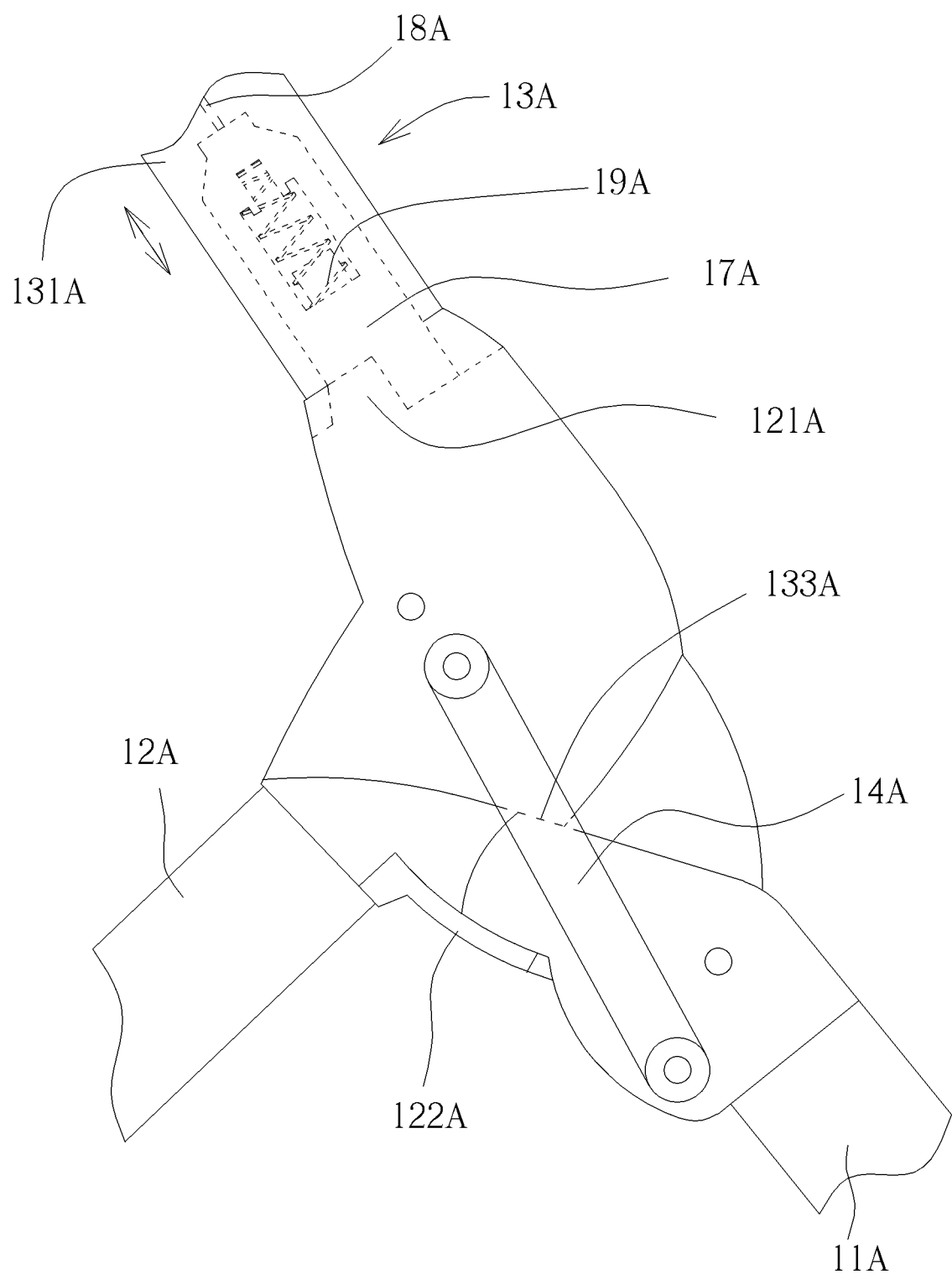
FIG. 13 is a partial enlarged diagram of the stroller according to the third embodiment of the present invention.

However, the structures and the configurations of the front leg, the rear leg, the handle assembly and the linking component are not limited to this embodiment. For example, please refer to FIG. 12 and FIG. 13. FIG. 12 is a partial diagram of a stroller according to a third embodiment of the present invention. FIG. 13 is a partial enlarged diagram of the stroller according to the third embodiment of the present invention. In the embodiment shown in FIG. 12 and FIG. 13, a front leg 11A can be rotatably connected to a rear leg 12A, a handle assembly 13A can be rotatably connected to the rear leg 12A instead of the front leg 11A, and a linking component 14A can be rotatably connected to the front leg 11A and the handle assembly 13A. Therefore, when the handle assembly 13A rotatably folds relative to the rear leg 12A forwardly in the counterclockwise direction, the handle assembly 13A drives the front leg 11A by the linking component 14A to rotatably fold relative to the rear leg 12A rearwardly in the clockwise direction, so as to achieve a compact and easy folding operation of the stroller.

As shown in FIG. 1, the handle assembly 13 includes a lower handle portion 131 and an upper handle portion 132. The stroller 1 further includes a handle pivoting assembly 15 disposed between the upper handle portion 132 and the lower handle portion 131. The handle pivoting assembly 15 is configured to restrain or allow a rotating movement of the upper handle portion 132 relative to the lower handle portion 131. In this embodiment, the handle pivoting assembly 15 can include a first body 151, a second body 152 and a movable component which is not shown in the figure. The first body 151 is connected to the lower handle portion 131. The second body 152 is connected to the upper handle portion 132 and rotatably combined with the first body 151. The movable component is movably disposed on the second body 152 and configured to engage with the first body 151 for restraining rotating movement of the second body 152 relative to the first body 151, or to disengage from the first body 151 for allowing the rotating movement of the second body 152 relative to the first body 151. When the movable component is disengaged from the first body 151, the upper handle portion 132 can be operated to rotatably fold relative to the lower handle portion 131 by the rotating movement of the second body 152 relative to the first body 151.

However, the structure and the configuration of the handle pivoting assembly are not limited to this embodiment. Any structure or mechanism which can restrain or allow the rotating movement of the upper handle portion relative to the lower handle portion is included within the scope of the present invention.

Preferably, in this embodiment, the stroller 1 further includes an operating component 16 connected to the handle pivoting assembly 15 and configured to unlock the handle pivoting assembly 15 for allowing the rotating movement of the upper handle portion 132 relative to the lower handle portion 131 when the operating component 16 is operated. In this embodiment, the operating component 16 can be connected to the movable component of the handle pivoting assembly 15, so as to drive the movable component to disengage from the first body 151 for allowing the rotating movement of the upper handle portion 132 relative to the lower handle portion 131. However, the present invention is not limited to this embodiment. In another embodiment, the operating component can be omitted, and the movable component can be pushed to disengage from the first body by an inclined surface disposed on the first body.

As shown in FIG. 1 and FIG. 2, the stroller 1 further includes a locking component 17, a connecting component 18 and a resilient component 19. The locking component 17 is movably disposed on the lower handle portion 131 of the handle assembly 13. The connecting component 18 is connected to the locking component 17. The front leg 11 includes an engaging component 112 corresponding to the locking component 17. The locking component 17 is configured to engage with the engaging component 112 of the front leg 11 for restraining a rotating movement of the lower handle portion 131 of the handle assembly 13 relative to the front leg 11 and further to be driven to disengage from the engaging component 112 of the front leg 11 for allowing the rotating movement of the lower handle portion 131 of the handle assembly 13 relative to the front leg 11. The connecting component 18 is configured to drive the locking component 17 to disengage from the engaging component 112 of the front leg 11. The resilient component 19 abuts against the locking component 17 to bias the locking component 17 to engage with the engaging component 112 of the front leg 11. When the lower handle portion 131 is fully unfolded relative to the front leg 11, the resilient component 19 can drive the locking component 17 to engage with the engaging component 112, which can effectively prevent an unintentional folding operation of the lower handle portion 131 relative to the front leg 11.

Figure 11:
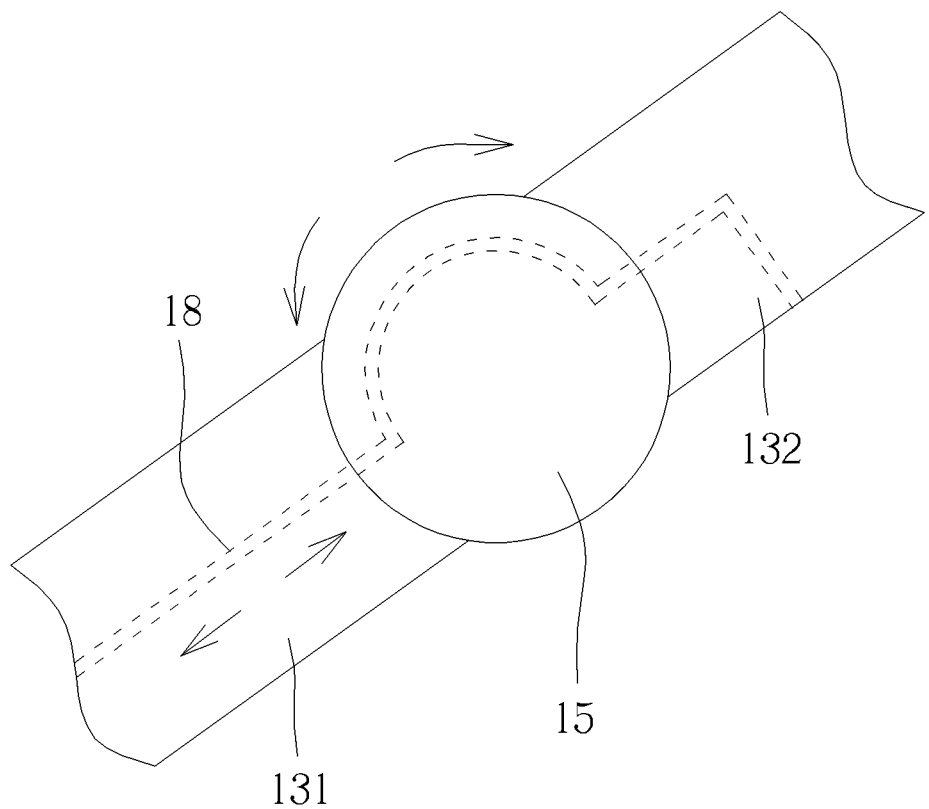
FIG. 11 is another partial enlarged diagram of the stroller according to the first embodiment of the present invention.

However, the present invention is not limited to this embodiment. For example, in the embodiment of FIG. 12 and FIG. 13, different from the first embodiment, the rear leg 12A can include an engaging component 121A, and a locking component 17A is movably disposed on the handle assembly 13A and configured to engage with the engaging component 121A. Furthermore, a connecting component 18A is connected to the locking component 17A and configured to drive the locking component 17A to disengage from the engaging component 121A, and a resilient component 19A abuts against the locking component 17A to bias the locking component 17A to engage with the engaging component 121A. Other Please refer to FIG. 11. FIG. 11 is another partial enlarged diagram of the stroller 1 according to the first embodiment of the present invention. As shown in FIG. 11, in this embodiment, the connecting component 18 can be further connected to the upper handle portion 132 of the handle assembly 13. Therefore, when the upper handle portion 132 rotates relative to the lower handle portion 131, the upper handle portion 132 of the handle assembly 13 can pull the locking component 17 to disengage from the engaging component 112 by the connecting component 18.

Figure 14:
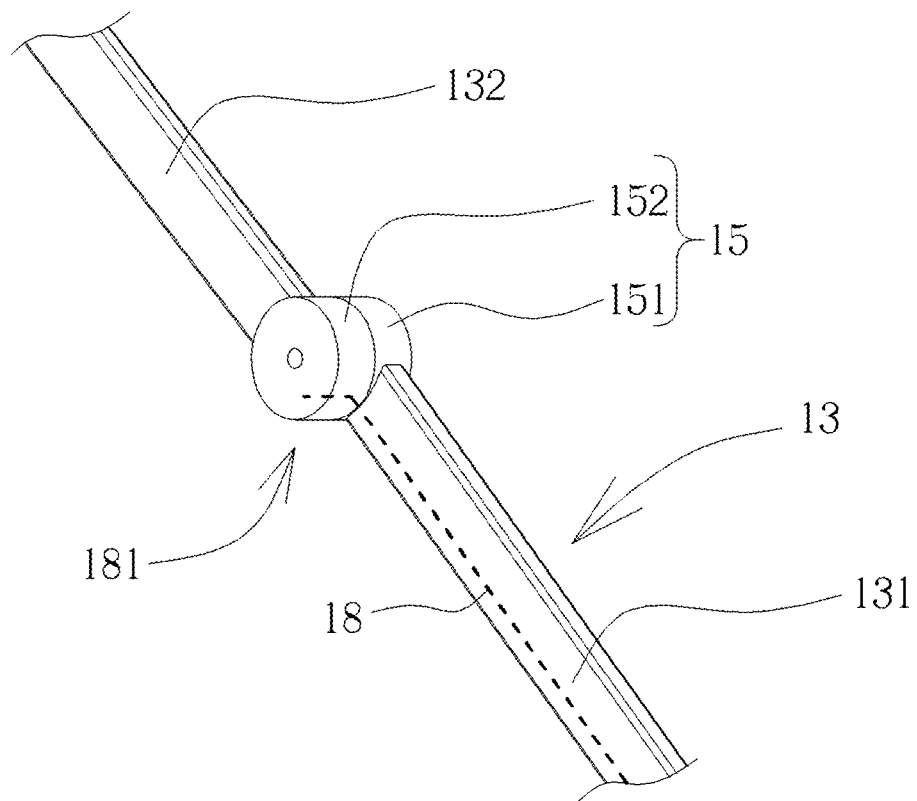
FIG. 14 is a partial diagram of the stroller according to another embodiment of the present invention.

However, the present invention is not limited to this embodiment. The connecting component can be connected to the locking component and one of the first body, the second body, and a pivoting mechanism of the handle pivoting assembly and can be driven to move by the one of the first body, the second body, and the pivoting mechanism of the handle pivoting assembly. For example, in another embodiment, an end of the connecting component can be connected to the pivoting mechanism, and another end of the connecting component can be connected to the locking component. The pivoting mechanism moves to drive the connecting component to disengage the locking component from the engaging component when the upper handle portion rotates relative to the lower handle portion. Furthermore, for example, as shown in FIG. 14, an end 181 of the connecting component 18 away from the locking component is connected to the second body 152 of the handle pivoting assembly 15 and can be driven to move by a rotating movement of the second body 152 relative to the first body 151 when the upper handle portion 132 of the handle assembly 13 rotates relative to the lower handle portion 131 of the handle assembly 13. In such a way, the stroller of the present invention is unlocked by rotating the upper handle portion relative to the lower handle portion.

Alternatively, in another embodiment, the connecting component can be connected to the operating component and the locking component, so that the operating component can pull the locking component to disengage from the engaging component by the connecting component when the operating component is operated. In other words, in this embodiment, when the operating component is operated, the upper handle portion and the lower handle portion can be rotatably folded relative to the lower handle portion and the front leg, respectively, which achieves a purpose of unlocking the handle pivoting assembly and the stroller.

Alternatively, in another embodiment, the upper handle portion can be fixed with the lower handle portion and cannot be folded relative to the lower handle portion, and the connecting component can be connected to the operating component. Therefore, the operating component can drive the locking component by the connecting component to disengage from the engaging component when the operating component is operated.

It should be noticed that, in the embodiment shown in FIG. 12 and FIG. 13, the handle assembly 13A can include be similar to the the connecting component 18A can be similar to the connecting component of any one of the aforementioned embodiments, i.e., a distal end of the connecting component 18A away from the locking component 17A can be connected to the upper handle portion, the operating component, or one of the first body, the second body, and the pivoting mechanism of the handle pivoting assembly disposed between the two handle portions, so as to drive the locking component 17A. Detailed description is omitted herein for simplicity.

Figure 6:
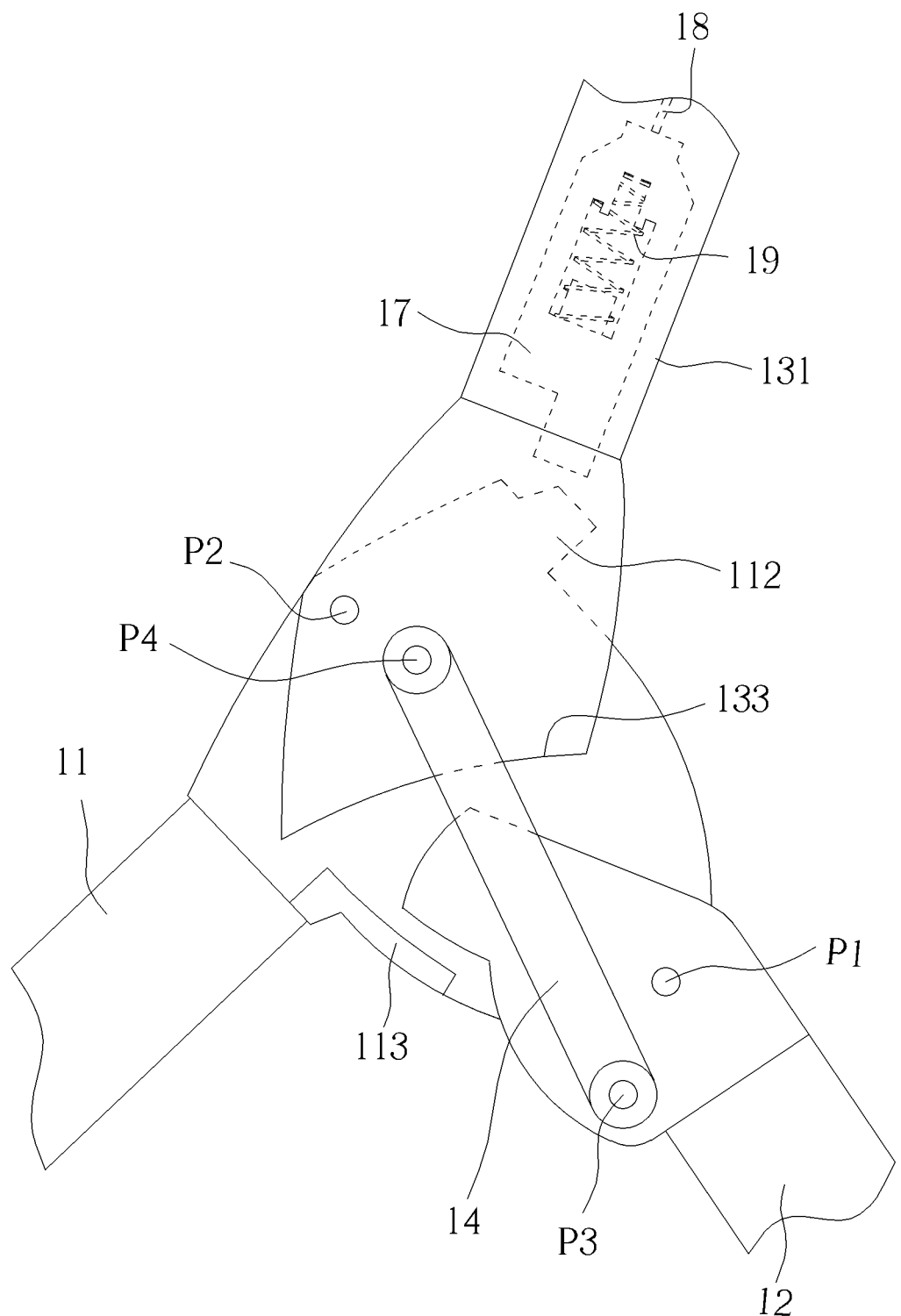
FIG. 6 and FIG. 7 are partial enlarged diagrams of the stroller in different states according to the first embodiment of the present invention.
Figure 7:
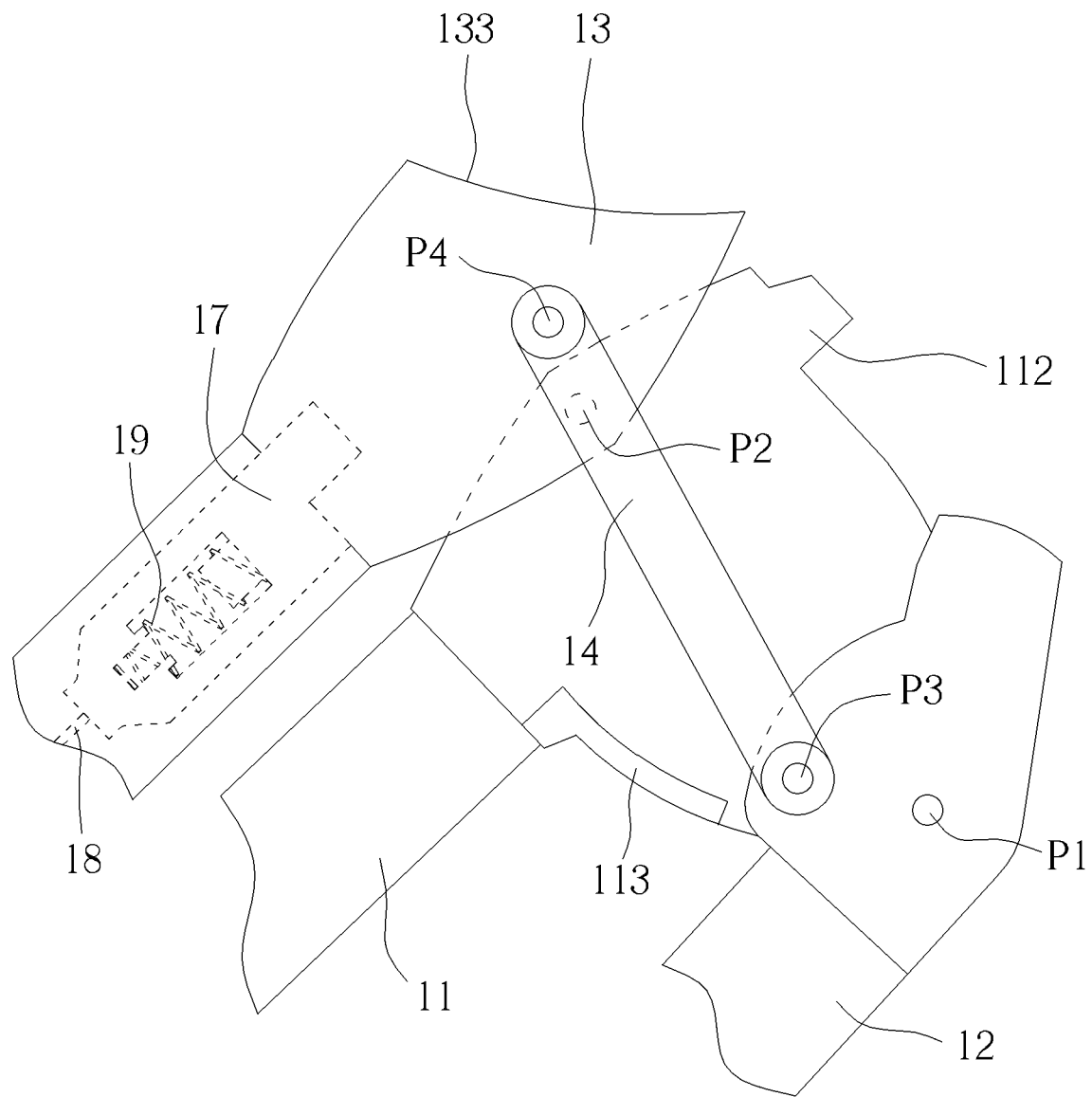

Besides, as shown in FIG. 2, FIG. 6 and FIG. 7, the handle assembly 13 further includes a first abutting portion 133. The front leg 11 includes a second abutting portion 113. The rear leg 12 is clamped by the first abutting portion 133 and the second abutting portion 113 cooperatively for restraining the rotating movement of the rear leg 12 relative to the front leg 11 when the lower handle portion 131 is fully unfolded relative to the front leg 11, which can effectively prevent an unintentional folding operation of the rear leg 12 relative to the front leg 11.

Also, in the embodiment shown in FIGS. 12 and 13, the handle assembly 13A can include a first abutting portion 133A, and the rear leg 12A can include a second abutting portion 122A, so as to clamp the front leg 11A by the first abutting portion 133A and the second abutting portion 122A cooperatively for restraining a rotating movement of the front leg 11A relative to the rear leg 12A in the clockwise direction and a rotating movement of the front leg 11A relative to the rear leg 12A in the counterclockwise direction when a lower handle portion 131A of the handle assembly 13A is fully unfolded relative to the rear leg 12A and positioned at a unfolded position by engagement of the locking component 17A and the rear leg 12A.

Figure 5:
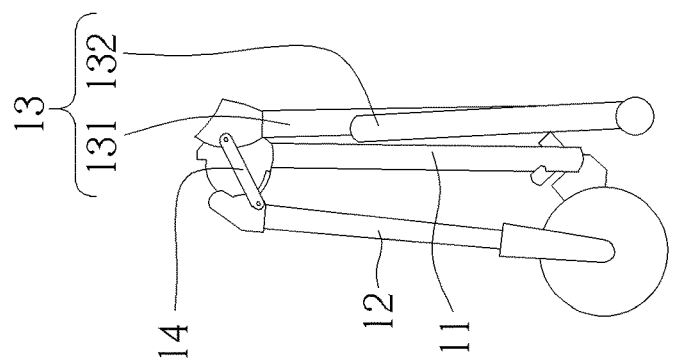
FIG. 3 to FIG. 5 are diagrams of the stroller in different states according to the first embodiment of the present invention.
Figure 4:
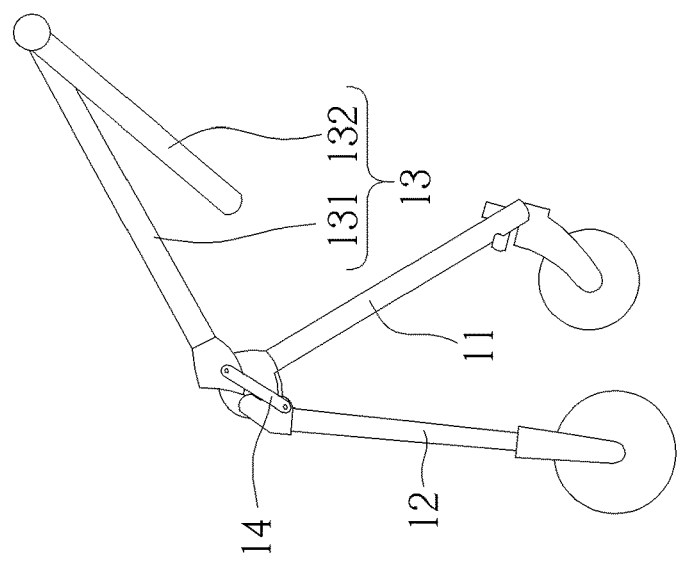
Figure 3:
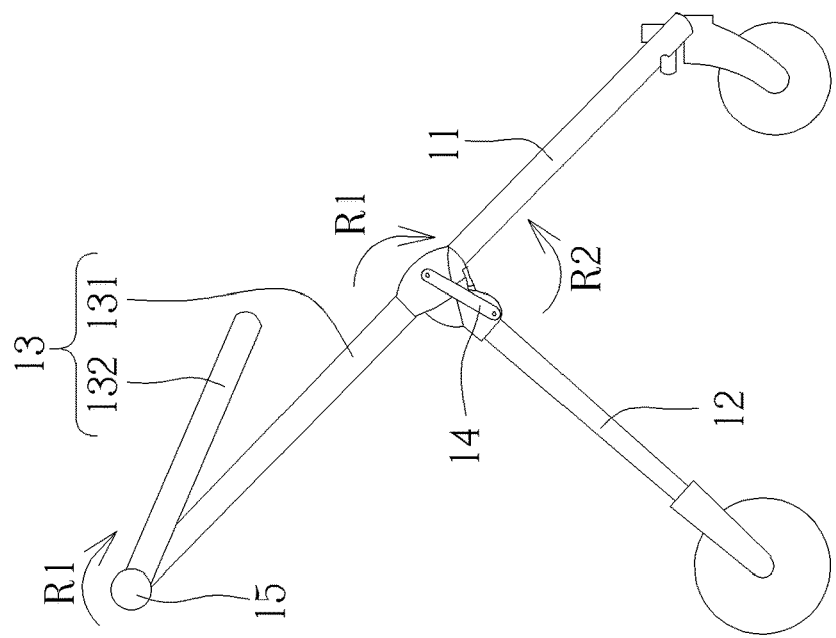

Description for the folding and unfolding operation is provided as follows. Please refer to FIG. 1 to FIG. 7. FIG. 3 to FIG. 5 are diagrams of the stroller 1 in different states according to the first embodiment of the present invention. FIG. 6 and FIG. 7 are partial enlarged diagrams of the stroller 1 in different states according to the first embodiment of the present invention. When it is desired to fold the stroller 1, the operating component 16 can be operated to unlock the handle pivoting assembly 15 to allow the rotating movement of the upper handle portion 132 relative to the lower handle portion 131. Afterwards, when the upper handle portion 132 rotatably folds relative to the lower handle portion 131 to a position shown in FIG. 3 in the first pivoting direction R1, the locking component 17 is driven to disengage from the engaging component 112. At this moment, a user can rotatably fold the entire handle assembly 13 relative to the front leg 11 in the first pivoting direction R1 to drive the rear leg 12 to rotatably fold relative to the front leg 11 in the second pivoting direction R2 or lift a fold handle 122 disposed on the rear leg 12 to drive the rear leg 12 and the handle assembly 13 to rotatably fold relative to the front leg 11 in two opposite pivoting directions by gravity until the stroller 1 is compactly folded as shown in FIG. 5 to achieve the folding operation of the stroller 1.

On the other hand, when it is desired to unfold the stroller 1, it only has to rotatably unfold the handle assembly 13 relative to the front leg 11. During unfolding operation of the handle assembly 13, the handle assembly 13 drives the rear leg 12 by the linking component 14 to rotatably unfold relative to the front leg 11. When the stroller 1 is unfolded as shown in FIG. 3, the resiliently deformed resilient component 19 can drive the locking component 17 to engage with the engaging component 112 for restraining the rotating movement of the lower handle portion 131 relative to the front leg 11, and the rear leg 12 can be clamped by the first abutting portion 133 and the second abutting portion 113 cooperatively for restraining the rotating movement of the rear leg 12 relative to the front leg 11. Afterwards, the user can unfold the upper handle portion 132 relative to the lower handle portion 131 to achieve the unfolding operation of the stroller 1.

Figure 10:
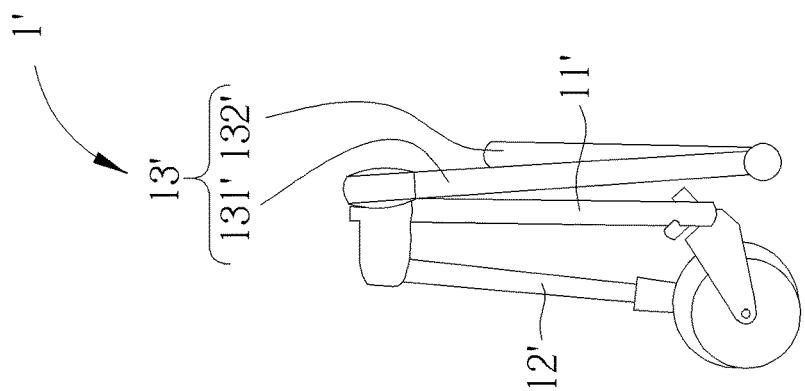
FIG. 8 to FIG. 10 are partial enlarged diagrams of a stroller in different states according to a second embodiment of the present invention.
Figure 9:
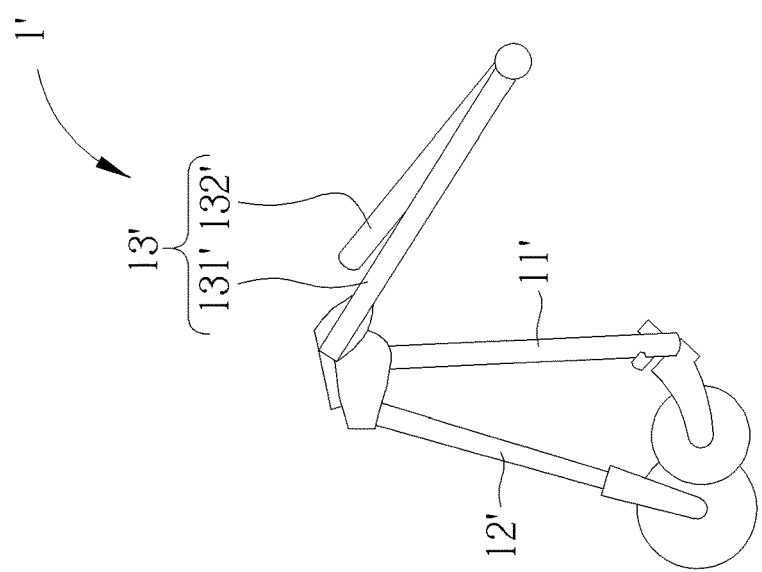
Figure 8:
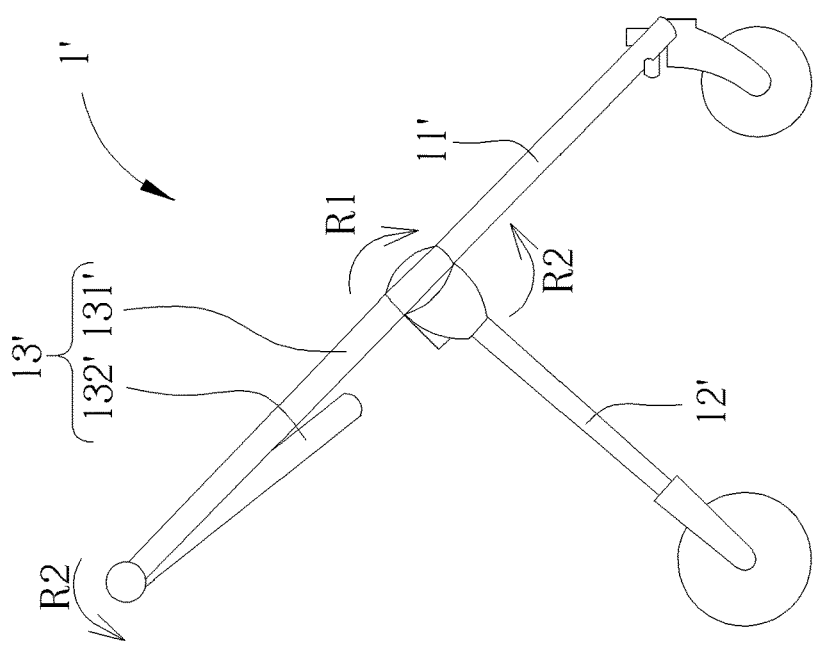

Furthermore, the structure and the configuration of the stroller are not limited to the above-mentioned embodiment. For example, please refer to FIGS. 8 to 10. FIG. 8 to FIG. 10 are diagrams of the stroller 1' in different states according to a second embodiment of the present invention. As shown in FIG. 8 to FIG. 10, different from the first embodiment, an upper handle portion 132' of this embodiment is configured to rotatably fold relative to a lower handle portion 131' in the counterclockwise direction, i.e., the second pivoting direction R2, when an operating component 16' is operated, and a locking component can be driven by the upper handle portion 132' to disengage from a front leg 11' when the upper handle portion 132' rotatably folds relative to the lower handle portion 131' in the counterclockwise direction. Other structure of this embodiment is similar to the one of the first embodiment. Detailed description is omitted herein.

In contrast to the prior, the present invention utilizes the rotating movement of the upper handle portion to drive the locking component to allow the rotating movement of the handle assembly relative to one of the rear leg and the front leg and further utilizes the rotating movement of the handle assembly to drive the other one of the front leg and the rear leg to rotate by the linking component. Therefore, the entire stroller is allowed to be folded easily and compactly by disengaging the locking component and then rotating the handle assembly, which brings convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
a front leg;
a rear leg rotatably connected to the front leg;
a handle assembly rotatably connected to the front leg, the handle assembly comprising a lower handle portion and an upper handle portion rotatable relative to the lower handle portion, the upper handle portion and the lower handle portion being tubular structures; and
a locking component movably disposed on the handle assembly, the locking component engaging with the front leg for restraining a rotating movement of the handle assembly relative to the front leg in a first pivoting direction and being further driven to disengage from the front leg for allowing the rotating movement of the handle assembly relative to the front leg in the first pivoting direction during a rotating movement of the upper handle portion relative to the lower handle portion in a second pivoting direction opposite to the first pivoting direction, the handle assembly and the front leg cooperatively engaging with the rear leg for restraining a rotating movement of the rear leg relative to the front leg when the locking component engages with the front leg.

2. The stroller of claim 1, wherein the front leg comprises an engaging component engaging with the locking component.

3. The stroller of claim 1, wherein the handle assembly comprises a first abutting portion, the front leg comprises a second abutting portion, and the rear leg is clamped by the first abutting portion and the second abutting portion cooperatively for restraining the rotating movement of the rear leg relative to the front leg.

4. The stroller of claim 1, further comprising a linking component rotatably connected to the handle assembly and the rear leg, a pivoting point P3 of the linking component and the rear leg is spaced from a pivoting point P1 of the front leg and the rear leg, a pivoting point P4 of the handle assembly and the linking component is spaced from a pivoting point P2 of the handle assembly and the front leg, and the handle assembly driving the rear leg to rotate relative to the front leg by the linking component when the handle assembly rotates relative to the front leg.

5. The stroller of claim 1, further comprising a resilient component abutting against the locking component to bias the locking component to engage with the front leg.

6. The stroller of claim 1, further comprising a connecting component connected to the locking component, and the connecting component driving the locking component to disengage from the front leg.

7. The stroller of claim 6, further comprising a handle pivoting assembly disposed between the upper handle portion and the lower handle portion, and the handle pivoting assembly configured to selectively restrain or allow the rotating movement of the upper handle portion relative to the lower handle portion in the second pivoting direction.

8. The stroller of claim 7, wherein the connecting component is further connected to one of the handle pivoting assembly and the upper handle portion, and the handle pivoting assembly or the upper handle portion connected to the connecting component drives the locking component to disengage from the front leg by the connecting component during the rotating movement of the upper handle portion relative to the lower handle portion in the second pivoting direction.

9. The stroller of claim 7, further comprising an operating component connected to the handle pivoting assembly, the operating component unlocking the handle pivoting assembly for allowing the rotating movement of the upper handle portion relative to the lower handle portion in the second pivoting direction when the operating component is operated.

10. A stroller comprising:
a front leg;
a rear leg rotatably connected to the front leg;
a handle assembly rotatably connected to the front leg, the handle assembly comprising a lower handle portion and an upper handle portion rotatable relative to the lower handle portion, the upper handle portion and the lower handle portion being tubular structures; and
a locking component movably disposed on the handle assembly, the locking component engaging with the front leg for restraining rotation of the handle assembly relative to the front leg in a first pivoting direction, the locking component being further driven by a rotating movement of the upper handle portion relative to the lower handle portion in a second pivoting direction opposite to the first pivoting direction to disengage from the front leg for allowing the rotating movement of the handle assembly relative to the front leg in the first pivoting direction during the rotating movement of the upper handle portion relative to the lower handle portion in the second pivoting direction;

wherein the handle assembly and the front leg cooperatively engage with the rear leg for restraining a rotating movement of the rear leg relative to the front leg when the locking component engages with the front leg.

* * * * *